United States Patent [19]
Pate

[11] Patent Number: 5,948,326
[45] Date of Patent: Sep. 7, 1999

[54] DEVICE AND PROCESS FOR LIQUID TREATMENT

[75] Inventor: Henry O. Pate, Port Orange, Fla.

[73] Assignee: Battelle Memorial Institute, Columbus, Ohio

[21] Appl. No.: 09/116,141

[22] Filed: Jul. 15, 1998

Related U.S. Application Data

[63] Continuation-in-part of application No. 08/895,420, Jul. 16, 1997.

[51] Int. Cl.[6] ........................................................ B01F 3/04
[52] U.S. Cl. ............................. 261/91; 261/92; 261/120; 95/218; 96/283; 96/332; 210/242.2
[58] Field of Search .................................. 261/84, 87, 120, 261/91, 92, 93, DIG. 71; 55/400; 95/175, 185, 218; 96/259, 283, 287, 332, 333, 355, 372; 210/222, 242.2

[56] References Cited

U.S. PATENT DOCUMENTS

| | | |
|---|---|---|
| 543,411 | 7/1895 | Taylor . |
| 3,295,682 | 1/1967 | Schramm ................................. 261/92 |
| 3,329,407 | 7/1967 | Clough et al. .................. 261/DIG. 71 |
| 3,489,396 | 1/1970 | D'Aragon .............................. 261/123 |
| 3,536,199 | 10/1970 | Cornelius ............................ 210/242.2 |
| 3,671,022 | 6/1972 | Laird et al. ............................. 261/93 |
| 3,703,462 | 11/1972 | Smith ..................................... 261/123 |
| 3,759,495 | 9/1973 | Boier et al. .............................. 261/92 |
| 4,190,619 | 2/1980 | Cherne ..................................... 261/92 |
| 4,382,044 | 5/1983 | Baumgarter et al ...................... 261/76 |
| 4,409,107 | 10/1983 | Busch ..................................... 261/120 |
| 4,522,151 | 6/1985 | Arbisi et al. ............................. 261/76 |
| 4,674,888 | 6/1987 | Carlson .................................. 366/337 |
| 4,708,829 | 11/1987 | Bylrhn et al. ............................ 261/62 |
| 4,902,302 | 2/1990 | Reid ....................................... 210/628 |
| 4,913,854 | 4/1990 | Miyahara ................................ 261/120 |
| 4,936,552 | 6/1990 | Rothrock ................................. 261/76 |
| 5,330,639 | 7/1994 | Murphree ................................ 261/92 |

FOREIGN PATENT DOCUMENTS

| | | |
|---|---|---|
| 111431 | 8/1925 | Switzerland . |
| 249654 | 1/1926 | United Kingdom . |

OTHER PUBLICATIONS

Perry, *Chemical Engineer'Handbook*.(McGraw–Hill, New York, 1984), pp. 26–43–26–4.

"Aeration"Manual of Practice #60. (American Society of Civil and Mechanical Engineers, 1985), pp. 86–98.

Pasveer, A, "Research on Activated Sludge."Sewage *Sewage and Industrial Wastes*, vol. 25, No. 12, (December, 1953), pp. 1397–1404.

*Primary Examiner*—C. Scott Bushey
*Attorney, Agent, or Firm*—Philip J. Pollick

[57] ABSTRACT

A liquid management unit uses a substantially horizontal rotor device partially submerged in a liquid so that at least a portion of a rotating component or the rotor device moves a liquid above the surface of the body of water and is then collected in a container for filtering, irrigation, or other purposes. A flap may be used with the container for opening and closing the container to incoming liquid. A control device such as an endless screw, chain, or rod may be used for opening and closing the flap especially when it is located on the interior of a shroud. A flow restriction unit can also be used with the liquid management unit to provide increased velocity to incoming liquid. The flow restriction unit is formed as a U-shaped member with an open inlet and opposite open outlet end. The inlet end cross sectional area may be increased by angling the sides outward at the inlet or slanting the bottom downward from the outlet to the inlet ends. The flow restriction unit can also be used in conjunction with a baffle and especially an articulated baffle to control the cross-sectional area through which the liquid flows.

11 Claims, 7 Drawing Sheets

DEVICE AND PROCESS FOR LIQUID TREATMENT

RELATED APPLICATION

This is a continuation-in-part of application Ser. No. 08/895,420, filed Jul. 16, 1997 all of which is incorporated by reference as if completely written herein.

BACKGROUND OF THE INVENTION

1. Field of the Invention

This invention pertains to a device and process for liquid treatment and more particularly to a portable water management unit capable of moving and treating large quantities of water.

2. Background of the Invention

As the 21st century approaches, world water resources face rising pollutant levels, record demand for water and aquatic products, while development has removed wetlands, paved watersheds and altered circulation with spoil islands, dams, bridges and other civil projects. So even as demand increases, the flow and circulation heartbeat of the aquatic system is being strangled or raced while its life-blood and productive muscle is being removed or degraded. Government has moved forcefully and with increasing success to mitigate point-source inputs from industry, but the costs for dealing with the effects of modern human activity stagger even first world nations. This is due to the sheer scope of the problem, which ranges from homeowner use of pesticides and oil to regional flood control needs, and the reliance of conventional methods on fixed installations for treatment of water before it enters receiving waters. While projects to limit upstream inputs are necessary, a paradigm shift is required from just pouring concrete and digging ponds to in stream management of receiving waters. Water body authorities must admit that efforts to maintain receiving waters in a "natural" state are not only futile, but in fact make certain that those waters will continue to degrade.

Although a number of devices and methods have become available, none of them meet the wide range of demands imposed by an ever growing number of problems in the aquatic environment. U.S. Pat. Nos. 543,411, 3,489,396, 3,671,022, 3,703,462, 3,759,495, 4,382,044, 4,522,151, 4,936,552 are illustrative of such devices and methods, it being noted that each is directed to a specific application and none of them meet the requirements for the variety of needs and problems currently faced by the aquatic environment.

In this vein, one thrust of water treatment has been to use ozone and air diffusers which have several distinct disadvantages. Typically they must be used in water ten feet deep to match the efficiency of mechanical aerators, diffusers tend to clog even with high quality filter systems, diffusion systems are not readily portable, they are readily fouled by fishermen, etc., they have low mixing velocities, they typically are a single application device (water treatment only) and often they entrain bottom sediments, decreasing water clarity.

A need exists for simpler storm water systems, especially smaller detention ponds with a more rapid turnover of detained water. It is estimated that the U.S. will spend $100–$500 billion dollars in the next 10 years to meet sewage/storm water treatment demands. In view of these greater quality requirements, it is essential to improve effluent quality in lagoons and at outfalls without large construction projects. Natural fisheries are being closed because of over-fishing and aquaculture operations are closing because of water quality problems and dropping water tables. Mariculture industries are facing problems in Norway, Canada, Chile and several areas in the United States. A need exists to restore the productivity of our estuaries, which are the nurseries for most fishery products. A need exists for a treatment process and unit that will allow aquaculture to treat water in the pond or around net-pens, lowering pumping and disease costs while mitigating environmental impact of fish culture. Besides water quality, a need exists for a device and process that will improve fish flesh quality by providing current for animals to swim against. Civil projects like bridges, spoil islands and docks have restricted flow and circulation of water bodies. A need exists to restore flow and enhance circulation without costly projects such as high-rise bridges.

A need exists to lessen dredging requirements by increasing water velocities at waterway choke points and to entrain surface sediments for maintenance dredging. A need exists to meet both sediment demand for oxygen and to lower volume by reducing the organic component of sediment during conventional dredging operations. Where hydraulic head/tides are right, a need exists to dewater flooded areas, or by proper timing, to reduce flooding by lowering tailwaters and increasing transmission rates of streams, rivers and canals. A need exists to provide a low cost sewage treatment plant that can be installed in a properly designed pond. A need exists to break up "red tide" concentrations of algae and remove noxious products from the water.

As an example of the seriousness of the water management problem, engineering studies conducted for the communities in the area of the Halifax and Indian River lagoon (a 60 square mile estuary next to Daytona), estimate that $100–$200 million will be required to slow the rate of decline in these waters. This expenditure would only address some aspects of estuarine problems and take five to ten years to implement, if the money could be found.

SUMMARY OF THE INVENTION

In response to these needs, a liquid management unit capable of moving and treating large quantities of water has been developed. The invention features various combinations of 1) a rotor device for introducing flow energy into a body of liquid, 2) one or more liquid directing baffles, 3) a shroud covering the rotor device including shrouds that form a sealed chamber with the body of liquid, 4) flotation devices such as pontoons for giving mobility and portability to the device, 5) rotating discs used as part of the rotor device for improving liquid flow and/or gasification including aeration, 6) a pumping device for diverting water from the rotor device for use in irrigation, filtering and other purposes, and 7) a flow restriction device for decreasing the cross-sectional flow area of incoming water and thereby increasing its velocity and/or controlling the direction of flow of the water.

When the shroud is used to form a sealed chamber, various devices for controlling the gas content of the chamber can be used including vacuum pumps, pressure pumps, bottled (pressurized) gases, and gas generators. The liquid directing baffles are particularly useful when used with a positioning device for selectively positioning the baffles in various orientations. Such articulated or movable baffles serve to control the direction of liquid flow to or from the rotor device. The baffle can be formed with an interior passage that is open at one end (the open end) and provides a continuous flow path to apertures from on the underside and near the second end of the baffle. By positioning the open end of the baffle in the sealed chamber with the opposite end including the apertures positioned in the body of water. Pressurized air or oxygen from the sealed chamber flows into the opened end of the baffle, through the interior baffle passage, and out the apertures into the body of water to satisfy the chemical oxygen demand of the water. The efficiency of the rotor devices can be improved significantly by using rotating discs having surface enhancements including dimples or slots or made from sintered or magnetic material. The discs can be made of gas-permeable material with a hollow interior and a connecting passage for a pressurized gas.

In one form, the liquid management unit of this invention comprises 1) rotary device for introducing flow-inducing energy into a body of liquid, 2) a first baffle for selectively receiving liquid from below the surface of the liquid and directing it to the rotary device, 3) a frame and attaching device such as a hinge or neoprene strip for securing the first baffle in proximity to the rotary device, 4) a second baffle for receiving treated liquid from said rotary device and selectively directing it below the surface of the body of liquid and away from the receiving flow of the first baffle, and e) an attaching device for attaching the second baffle in proximity with the rotary device.

The first and second baffles can have an upper member and a lower member with one or more spacers such as posts or ribs for maintaining the upper member and lower member in spaced-apart relation. Further, the lower members of the first or second baffles or both can have perforations formed in them to afford more complete dissolution of air or gas into the liquid. By placing perforations in both baffles, the rotary device can be reversed and the unit operated equally effectively in both a forward and reverse direction without altering unit deployment.

One or more arms are used to selectively position the first or second baffle or both with respect to the surface of the liquid. Such positioning can be used to drive the air/water stream to deeper water, a region of increased oxygen solubility. It also allows the direction of inlet/outlet streams for dredging and mixing configurations and for accessing deeper, more contaminated intake water.

The rotary device includes a plurality of discs mounted on an axle for rotation with the discs at least partially in contact with the liquid, that is, partially submerged in the liquid. The discs can have edge notches, slots, dimples or other surface enhancement for extending contact with the liquid and to carry gas bubbles into and below the surface of the liquid and can be advantageously formed from a sintered, pumice-like material to increase the liquid contact area, produce additional gas bubbles and provide a colonization surface for bacteria such as a nitrification species. The discs may also be treated with an appropriate coating to enhance liquid contact.

The portion of the discs that extend above the liquid can be covered with a shroud to protect the discs from the environment and vandalism. In a typical configuration, air vents into and out of the chamber formed by the shroud. To form a sealed chamber, an air tight shroud contacts and extends into the liquid. A conduit can be attached to the shroud and a vacuum applied to remove volatile organic compounds or other noxious gases such as those produced by red tides. The conduit can also be used to supply a pressurized gas to the sealed chamber.

Although the liquid management unit can be affixed to a permanent structure such as a bridge, maximum flexibility and minimum environmental harm is achieved by supporting the device on one or more floats (pontoons). A pontoon supported unit can be readily moved about on the surface of the water to achieve maximum effect and the unit can be taken from the water and moved overland to other water sites. A portable device avoids the high cost of constructing fixed installations and provides instream treatment using public domain lands. It opens a wide range of applications, especially in third world countries, where fixed units cannot be built due to construction, land or power restrictions. Portable units provide a flexible response to water management needs with units being shifted as environmental conditions change. The units have the advantage of mass-production savings and are useful in multiple applications including dredging, flood control, and water treatment.

In treating a body of water, the first baffle is selectively positioned to selectively receive a liquid from a first targeted volume of a body of liquid. The rotary device is then used to direct flow inducing energy into the liquid after which the selectively positioned second baffle directs the liquid to a second targeted volume of the body of liquid. In addition to energizing the liquid, the rotary device can be used to introduce a gas such as air into the liquid. Depending on the requisite treatment, a gas such as oxygen or ozone can be introduced into the targeted volume of liquid under pressure using the sealed shroud described above. By positioning the second baffle so that gas bubbles entrained by the discs are directed beneath it, the second baffle provides additional contact time of the gas with the targeted volume of liquid for further dissolution. In addition, the gas car be directed through a set of perforations or slots in the baffles to further pre-aerate or polish the liquid being treated. The sealed shroud can also be used for applying a vacuum to the shroud chamber to remove volatile gases from the liquid.

By sealing the ends of the baffles that extend downward into the water and positioning the opposite ends so that they extend above the water line within the sealed shroud, a three-point water treatment device and process is achieved. Pressurized air or oxygen flows through the hollow interior portion of the first baffle and emerges from apertures, e.g., perforations or slots, in the lower member of the first baffle to satisfy the chemical oxygen demand of the water being received from the body of water to be treated. Having met the chemical oxygen demand, the water moves to the rotor assembly where further aeration by the rotor discs satisfies any remaining chemical oxygen demand and also provides high gas transfer rates to the water. The second baffle serves to maintain the air bubbles entrained by the rotor discs in contact with the water thereby promoting further oxygenation. Finally, pressurized gas flows through the interior portion of the second baffle and emerges through perforations or slots in the lower member of the second baffle to complete the oxygenation process and satisfy the oxygen demand of the water.

The rotor device, typically constructed with spaced-apart discs, and the input and output baffles can be oriented in a variety of directions including a vertical orientation. A rotor and baffle vertical orientation provides a circular, horizontal flow about the rotor at a relatively constant liquid depth while a horizontal orientation produces a vertical flow path about the rotor that cuts across various depths of the liquid. For aeration with a vertical rotor and disc assembly, the rotor axle can be formed with a hollow interior with radial ports that lead to the interior of hollow, gas-permeable porous discs. Pressurized gas is fed into the interior of the axle and travels through the radial ports into the interior of the discs from which it passes through the porous discs into the liquid as small bubbles of gas.

A pumping device uses a container, e.g., a trough, for collecting liquid that is carried above the surface of the body of liquid by the rotating component (e.g, cage, brush, discs, etc.). The device is especially useful for providing liquid for filtering, irrigation, and other uses. A flap can be used with the container for opening or closing the container to incoming liquid from the rotor device. The flap is opened and closed with a control member such as a chain, rod, bar, or endless screw and is especially effective when formed as part of a shroud.

This invention also features an inlet restriction assembly for increasing the velocity of liquid to the rotor device and output stream. In its basic form, the inlet restriction device consists of a bottom and two side members with open ends. Incoming liquid enters at the first (input) end and leaves at the opposite (output) end. Increased liquid flow velocity can be achieved by forming the device with a cross-sectional flow area that decreases in area from the input end. Narrowing of the cross-sectional area can be accomplished in several ways including 1) orienting the device so that the side members extend above the surface of the water with the inlet end being submerged to a greater depth than the opposite outlet end, 2) forming the device so that the bottom slants upward from the inlet end to the opposite outlet end, and 3) angling one or both of the sides outward at the inlet end, or 4) a combination of two or more of these arrangements. The restriction device can also be used in combination with a baffle that is at least partially contained within the restriction assembly and serves to restrict the area of cross-sectional flow. An articulated baffle has the further advantage of allowing variation in the cross-sectional area of constricted flow.

The foregoing and other objects, features and advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

In describing the preferred embodiment of the invention which is illustrated in the drawings, specific terminology is resorted to for the sake of clarity. However, it is not intended that the invention be limited to the specific terms so selected and it is to be understood that each specific term includes all technical equivalents that operate in a similar manner to accomplish a similar purpose.

Although a preferred embodiment of the invention has been herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF THE INVENTION AND BEST MODE FOR CARRYING OUT THE PREFERRED EMBODIMENT

Figure 1:
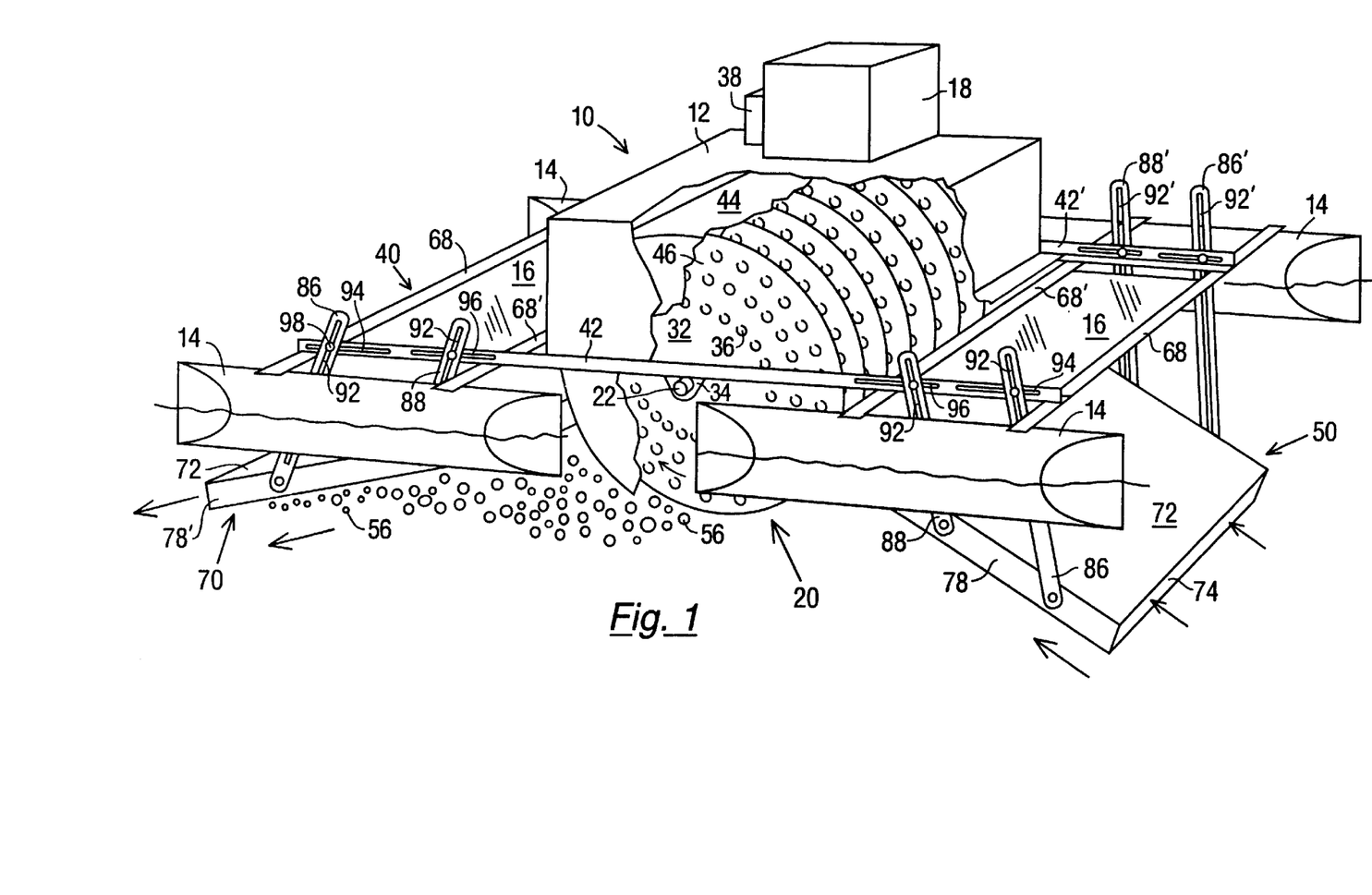
FIG. 1 is a perspective view of the present invention partially broken away to illustrate the aerator discs and the shroud cover.
Figures 2, 3, 4:
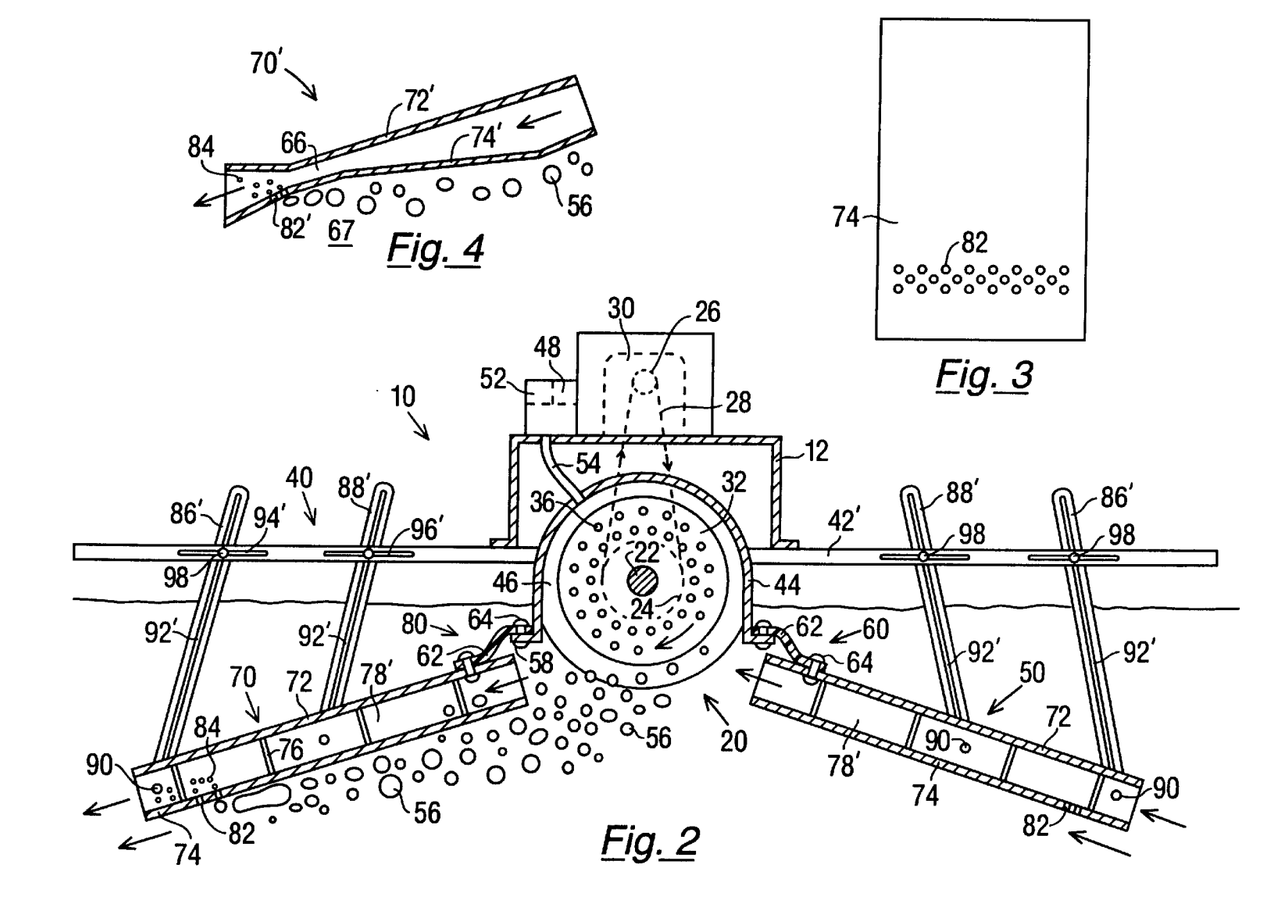
FIG. 2 is a cross-sectional view of the invention.
FIG. 3 is a front elevation of the lower member of a baffle illustrating the perforations formed therein.
FIG. 4 is a cross-sectional view of a second embodiment of a baffle illustrating a constricted region formed therein for enhancing small bubble formation.

With reference to FIGS. 1–3, a liquid management unit is designated generally with the numeral 10 and in its basic form comprises a) a rotor device 20 for introducing flow-inducing energy into a body of liquid, b) a first baffle 50 for receiving liquid from below the surface of a body of liquid and directing the liquid to rotor device 20, c) a first baffle fastening assembly 60 for securing the first baffle in proximity with the rotor, d) a second baffle 70 for receiving treated liquid from the rotor device 20 and directing the treated liquid below the surface of the body of liquid, and e) a second baffle fastening assembly 80 for securing the second baffle in proximity to the rotor device 20.

Rotor Device

The rotor device 20 comprises an essentially horizontal shaft (axle) 22 onto which are mounted a plurality of spaced-apart discs 32. In a typical unit 10, seven to ten discs 32 with a diameter of about 4.5 feet (1.4 m) are used. Appropriate pulleys 24 and 26 reduce the speed of motor 30 to about 50 rpm. This low speed is environment and swimmer safe. The discs 32 are spaced about 5 inches (12.7 cm) apart and are immersed about 21 inches into the water column.

The shaft 22 is mounted to frame 40 using a suitable journal box 34 attached to frame member 42. A similar mounting device (not shown) is used to mount shaft 22 at its opposite end to frame member 42'.

Although a wide variety of motors 30 may be used to drive the rotor device 20 including both electrical and gas driven motors, a natural gas 5 horsepower (3730 W) engine currently under mass-production for heat-pumps is used in a typical unit. Such engines are more fully described in U.S. Pat. No. 5,230,321, all of which is incorporated herein by reference as if completely written herein. Such natural gas engines are high efficiency with low pollution and cost about $0.61/therm as compared to electricity costs of about $2.4/therm. The natural gas engine requires low maintenance with a typical 180 day service interval and has a continuous-duty, engine life of about six years. Furthermore, the engine can be converted for use with methane where conversion of biomass is desired.

Unlike standard pumps, rotor device 20 works by slow rotation of a large disc surface area, not by spinning a small area rapidly. The discs 32 work by dragging water, not by pushing or lifting. While this means the unit cannot pump water uphill, although a significant portion of the water moved by the unit can be diverted for low head applications using the pumping assembly discussed below, energy is applied efficiently to move the most water. And since rotational speed is low, without sharp impeller surfaces, impact on biota is minimized.

Based on tank tests and data from the disc manufacturer, the pumping rate of this unit has been estimated at 3 million cu. ft./day (0.085 million m$^3$/day). This approaches the ability of the unit's horsepower (3–4 hp (2240–2980 W) dedicated to disc drive, remainder to ozone production) to do work, and is made possible by the drive units unique configuration (for a pump) and it's employment in open channels with some hydraulic head. As water is moved toward the unit's outlet, water adjacent to the unit's inlet must move to replace that water, lessening energy required to overcome the water's inertia as it contacts the disc-drive 20.

Based on that process, but on a larger scale, there is a pumping or "entrainment effect" caused by the unit's deployment in an open channel. By using the unit to move water past one point, additional water upstream must move to replace it, increasing circulation effects.

To further increase the efficiency of the pumping action of discs 32, the disc surface can be enhanced to extend contact with the liquid. To this end, the discs 32 are provided with dimples 36 or slots and other apertures. In addition, the discs 32 can be made of a sintered, pumice-like material which further increases the contact area and can, under appropriate conditions, provide a colonization surface for appropriate forms of bacteria such as nitrifying bacteria. The disc surface can be enhanced further by treatment to increase liquid pumping rates. To this end, the surface can be rendered magnetic or coated to alter the attraction between the liquid and the disc surface.

A shroud (shell) 44 is placed over the portion of discs 32 that extend above the water line to protect the discs from the environment and vandalism. In a standard configuration, the shroud 44 vents air freely in and out of the interior chamber 46 formed by the shroud 44. By using a sealed shroud 44 so that it contacts and extends below the surface of the water, a sealed chamber 46 is formed. Conduit 54 is attached to shroud 44 providing access to sealed chamber 46. A vacuum pump 48 can be used to apply a vacuum to sealed chamber 46 through conduit 54 in order to remove volatile organic compounds (VOCs) or other noxious gases produced, for example, by red tides. Alternatively a pressurized gas such as oxygen or ozone can be provided through conduit 54 by means of pressure pump 52 to the sealed chamber 46 to facilitate high transfer rates of the gas to the liquid. The pressure pump 52, vacuum pump 48, or an ozone generator can be driven by the natural gas engine 30 used to drive the rotor device 20. Typically about 3 to 4 horsepower (2240–2980 W) of a natural gas engine 30 is dedicated to the rotor device 20 with the remainder being used for vacuum formation, pressurization, or ozone formation.

In addition to imparting flow-inducing energy to the liquid, the rotor drive 20 and discs 32 serve another major function which is the gasification of the liquid as a result of the production of bubbles 56. Bubble formation is facilitated by disc surface enhancement including the formation of dimples 36, slots, and other apertures in the discs 32 and use of a sintered, pumice-like disc material. Most aeration takes place in the area immediately adjacent to an aerator's active element, in this case, the rotating discs 32. As seen in FIGS. 1 and 2, bubbles 56 are driven into the liquid by the discs 32 and, if unrestrained, move quickly to the surface of the liquid. To this end, it has been found expedient to mount baffle 70 in close proximity to the rotor device 20 so as to prevent the bubbles from rising to the surface and drive them along the underside of the baffle 70. This allows prolonged contact of the bubbles 56 with the liquid and allows their further dissolution into the liquid.

Output Baffle

As shown, baffle 70 is attached to a flange 58 on the shroud using a flexible, resilient material 62 such as neoprene that extends preferably fully, but at least partially across baffle 70. Any conventional fastening technique may be used to fasten the resilient material to lip 58 and baffle 70 such as by riveting with rivets 64. Although baffle 70 may be rigidly attached in proximity to the rotor device, a flexible attachment is preferred. In addition to resilient material 62, a more rigid metallic hinge could be used to fasten baffle 70 in the vicinity of the rotor device 20. However, use of a flexible attachment material such as neoprene has the further advantage of allowing flexibility in positioning baffle 70 with respect to rotor device 20 and, in addition, prevents the escape of bubbles 56 between shroud 44 and baffle 70. Further, a flexible attachment material 62 allows the angular orientation of baffle 70 with respect to the liquid surface to be easily changed thereby allowing direction of the liquid flow to be conveniently altered. For example by increasing the baffle angle with the liquid surface, the water and air stream is driven into deeper water, a region of increased oxygen solubility. Although baffle 70 is shown attached to flange 58, it is to be realized that baffle 70 could also be attached to frame 40 or to other available unit structures such as shroud cover and engine base 12.

Although it is possible to make the baffle 70 from a single sheet of material, construction in the form of a shallow, open-ended rectangular parallelepiped or similar configuration provides certain additional advantages. Typically the baffle 70 in such a configuration has an upper member 72 and a lower member 74 with the two members maintained in spaced-apart relation using spacers such as pins 76 or ribs. Members 78, 78' are used to close the sides of the configuration; however both ends are open to permit the flow of water there through.

As seen in FIG. 3, lower member 74 has a set of perforations 82 formed therein. As bubbles 56 are forced along lower member 74 by the flow of water from the rotor device 20, they encounter perforations 82, which because of the buoyancy of bubbles 56 and the venturi effect produced by the liquid flowing through the baffle 70 (between the lower member 74 and the upper member 72) and over the perforations 82, the bubbles 56 are broken into considerably diminished size bubbles 84 as they pass though perforations 82. Because of their small size, bubbles 84 have a considerably increased surface area that further promotes their dissolution in the liquid. It is to be realized that this embodiment requires a liquid velocity flowing through the baffle that is greater than that typically achieved by the rotating disc unit. As such, this design is more suitable to bodies of water already having a natural flow although suitable velocities through the baffle can be achieved by the use of a small liquid pump. To this end, FIG. 4 illustrates an alternate output baffle 70' in which the upper member 72' and the lower member 74' are formed so as to have a narrow region 66 in which faster flowing liquid produces a venturi effect at perforations 82' to further promote the formation of smaller bubbles 86. In addition, a region 67 is formed below lower member 74' that tends to retain bubbles 56 for passage through perforations 82'.

Returning to FIGS. 1–3, the second baffle 70 is secured further to the frame 40 by means of arms 86, 88 and 86', 88' attached at one end to baffle side members 78, 78', respectively, by means of pivot pins 90. The arms 86, 86', 88, and 88' have a slots 92, 92' formed therein. Slots 92,92' cross slots 94, 94' 96, 96' formed in frame member 42, 42'. Arms 86, 86', 88, and 88' are fastened to frame members 42, 42' by means of a suitable fastener such as a nut and bolt 98. This arrangement of slots 92, 92' and 94, 94' in both the frame members 42, 42' and the arms 86, 86', 88, and 88' allows the baffle 70 to be adjusted to a variety of angles with the surface of the fluid and also to be placed in various degrees of proximity to rotor device 20.

It is to be appreciated that a wide variety of other baffle fastening and positioning methods and hardware will be readily apparent to those skilled in the art. Such configurations are considered to be within the scope of the appended claims.

Input Baffle

As shown in FIGS. 1–3, baffle 50 and its fastening assembly 60 are formed from and attached with parts that are essentially the same as those used for baffle 70 and attaching assembly 80. As such, corresponding parts have been given the same identifying numbers as those used for baffle 70. Although the structure of baffle 50 is the same as baffle 70, it functions in a much different manner. While baffle 70 and fastening assembly 80 serve to maintain bubbles 56 and 84 in contact with the liquid for as long a period as possible and direct the energized and aerated (gasified or otherwise treated) liquid to a selected portion of the body of liquid, baffle 50 and fastening assembly 60 serve a much different function. They function to receive and direct liquid from the body of water to the rotor device for introduction of energy and gasification or other treatment process. In addition, and depending on the orientation of baffle 50, it can be used for dredging, for maintaining particles in a suspended state, or accessing deeper more contaminated waters or waters with less dissolved oxygen for treatment. Although baffle 50 can be of different construction than baffle 70, for example, made from a single sheet of flat stock, typically the arrangement shown, in which both baffles 50 and 70 are identical, is used since the function of baffles 50 and 70 can be instantaneously reversed by simply reversing the rotational direction of rotor device 20. To this end, the lower member 74 of baffle 50 also contains perforations 82 (FIG. 3).

As should be apparent, a key feature of the present invention is the use of two independently oriented baffles 50 and 70 that can be arranged and positioned to cooperate with each other for a wide variety of functions and purposes. Thus the ability to selectively orient each of baffles 50 and 70, i.e., the inlet and outlet streams from rotor device 20, allows unit 10 to be used for a wide variety of applications including dredging, mixing, prevention of sediment formation by maintaining particles in suspension, and for aeration and decontamination of a body of water.

Flotation Device

Although the rotor device 20 and baffles 50 and 70 can be affixed to a permanent structure, maximum utility from the present invention is achieved by mounting the unit on a frame 40 supported by one or more floats (pontoons) 14 or other flotation device such as a barge or other similar vessel. The pontoon construction is preferred in that unit 10 can be easily transported from site to site.

As seen in FIG. 1, frame 40 consists of various cross members 68, 68' along with various longitudinal members 42,42', suitably affixed to the pontoons 14 by means known in the art. The frame supports the rotor device 20 and the other components of the unit. Suitable decking 16 can be provided for storage of engine fuel, treatment gases, and other related materials. A shroud cover 12, engine cover 18, and a vacuum, pressurization, ozone, or ultraviolet treatment unit cover 38, protect these components from the elements and vandalism.

Three-Point Treatment Device and Process

Figure 5:
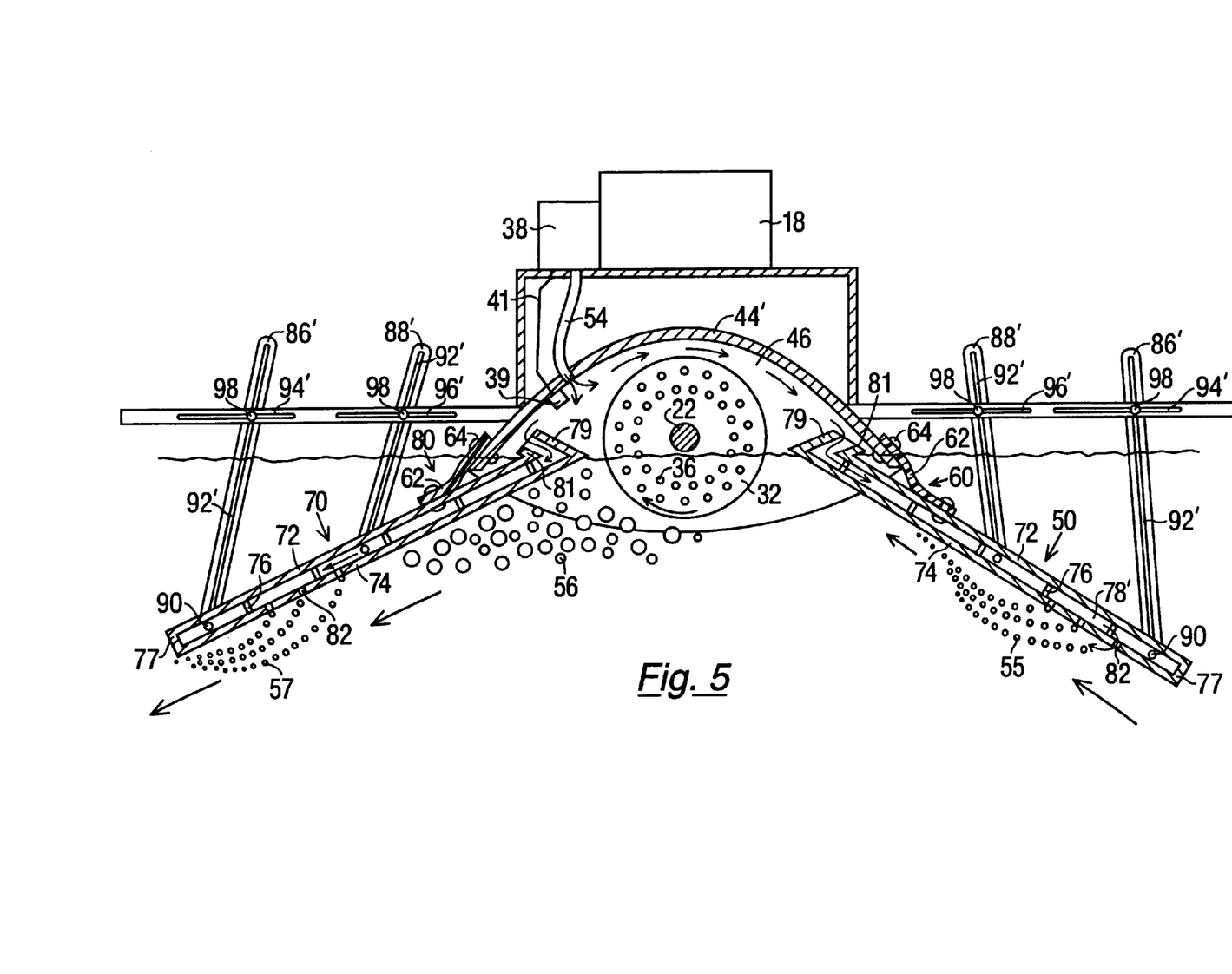
FIG. 5 is a cross-sectional view of another embodiment of the invention illustrating a three point aeration device with pre-aeration of incoming water, primary aeration using the rotor discs, and post-aeration of water leaving the rotor device.

FIG. 5 shows an embodiment of the invention that is particularly suited for aeration, oxygenation, and other treatment of a body of water. This embodiment is similar to the device shown in FIGS. 1–3, and as such, corresponding parts have been given the same identifying numbers as those shown in FIGS. 1–3. Except as noted below, the various parts interact and function as previously described.

The shroud 44' in FIG. 5 has a flattened or parabolic shape and extends into and below the water line to form a sealed chamber 46. Chamber 46 is pressurized through conduit 54, typically with a gas such as air, oxygen, or ozone. Unlike the baffle disposition shown in FIG. 2, the upper ends of baffles 50 and 70 extend into the sealed chamber 46. Further, only the upper ends of baffles 50 and 70 are open with the opposite ends being closed by ends 77. The optionally bent portions 79, 81 of lower member 74 and upper member 72, respectively, are used to prevent excess liquid spray from rotor device 20 from entering the interior of baffles 50 and 70. A UV radiation source 39 may be placed within chamber 46 with cable connection 41 passing to a conventional UV power source contained within housing 38.

Taken together, the inlet and outlet baffles 50 and 70 and sealed chamber 46 provide a three-point water treatment process which improves aeration efficiency and pollution removal over single point aerators. This is because before an increase in dissolved oxygen (DO) can occur in treated water, the instantaneous chemical oxygen demand (COD) must be substantially satisfied. In single point aeration, as a slug of water contacts the active element, most of the oxygen transferred is taken up immediately by COD and the slug then moves out of the influence of the aerator.

In FIG. 5, the slug of water first contacts the inlet baffle 50 at its lower end where it encounters air bubbles 55 which begins to satisfy COD. Air bubbles 55 are delivered through slots or perforations 82 as a result of pressurized gas such as air; oxygen or ozone flowing from pressurized chamber 46 into the upper end of baffle 50, through the interior of baffle 50, and leaving through perforations 82. The slug then moves to the chamber region 46 where it is treated under very high air/water surface areas in the presence of air, oxygen, ozone or UV radiation or some combination thereof with the pressurized chamber providing high gas transfer rates to the liquid. Baffle 70 maintains entrapped bubbles 56 in contact with the slug promoting additional gas transfer to the slug. Finally as the slug nears the end of baffle 70 it encounters bubbles 57 which complete the aeration process, COD having been addressed at the initial aeration points. Bubbles 57 are delivered to the slug through slots or perforations 82 in lower member 74 of baffle 70 as a result of pressurized gas flowing from chamber 46 into the interior of baffle 70 through the upper end of baffle 70 that extends into chamber 46.

Vertical Rotor Device

Figure 6:
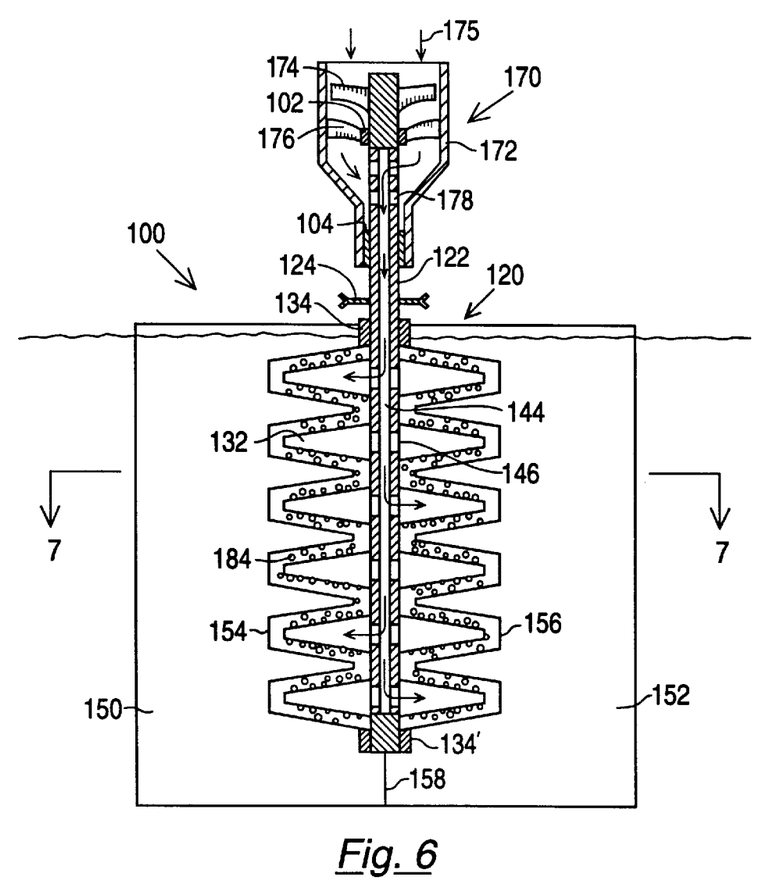
FIG. 6 is a partial front view in partial cross section of an alternate embodiment of the present invention in which a vertical orientation of the rotor device is used.
Figure 7:
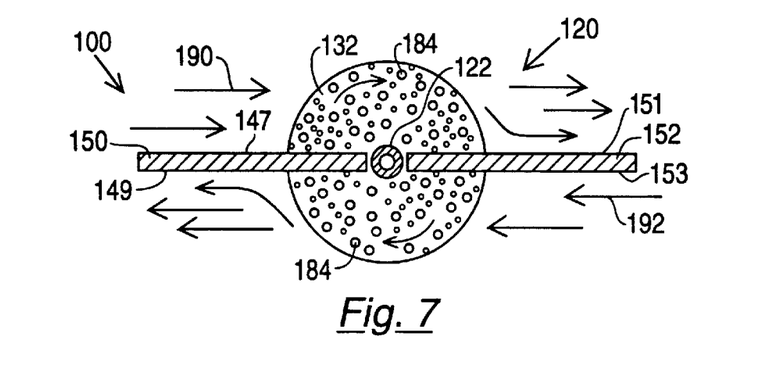
FIG. 7 is a cross section view taken along line 7—7 of FIG. 6.

FIGS. 6 and 7 illustrate an alternate embodiment of the present invention designated generally by the numeral 100 in which a vertical orientation of the rotor device 120 is used. Vertical axle 122 is attached to baffles 150 and 152 by means of bearing housings 134, 134'. Vertical axle 122 has a coaxial bore 144 formed therein with radial ports 146 opening to the exterior of axle 122. Hollow, spaced-apart, porous discs 132 are mounted on axle 122 over ports 146 to provide a passage from bore 144 to the interior of hollow discs 132.

A pressurized gas source such as fan 170 provides pressurized gas, e.g., air, to bore 144. Other pressurized gas sources including pressurized gas cylinders may be used to provide pressurized gas to bore 144 by means of direct coupling to axle bore 144. As shown, air 175 enters into stationary fan housing 172 and is directed downward by rotary blades 174 and stationary vanes 176. Bearing housings 102 and 104 allow housing 172 and vanes 176 to remain fixed in a stationary position while blades 174 rotate on axle 122. The pressurized air enters bore 144 through radial ports 178 formed in axle 122 and proceeds downward in bore 144 and then radially outward through ports 146 and into the interior of discs 132 where it then emerges from the porous disc material in the form of small aeration bubbles 184. Radial ports 146 can be of varying size to ensure delivery of gas to the deepest disc. Axle 122 is rotated by means of pulley 124 which in turn is driven by a suitable engine and associated pulleys, belts, gears and transmission.

Although the fan 170 and discs 132 are shown as having a common axle 122, it is to be realized that in some cases it may be necessary for the fan 170 and the discs 132 to be mounted on separate axles in order to operate each at a different speed as for example when a low disc rotation speed is used but higher rotation speeds are required to produce sufficient pressure for optimal gasification of the liquid via the porous discs 132.

Baffles 150 and 152 are formed with toothed edges 154 and 156, respectively, that mate in spaced-apart relation with rotating discs 132. The toothed edges 154 and 156 are spaced-apart from discs 132 sufficiently to permit free rotation of discs 132 but are sufficiently close to prevent liquid flows on each side of baffles 150 and 152 from impinging on each other. As shown in FIG. 6, baffles 150 and 152 are secured and maintained in proximity to rotor 120 by attachment to bearing housings 134, 134'. Alternatively or in addition to the bearing housing attachment, the baffles 150 and 152 or rotor device 120 or both may be secured in proximity to each other by attachment to appropriate framing members. Baffles 150 and 152 may also be joined to each other such as at joint 158 or alternatively formed as a single, integral unit. Typically the rotor, baffles, engine, and other associated components are mounted on appropriate framing and supported with one or more floats or with a piling or bridge structure.

As shown in FIG. 7, liquid 190 is directed by the first side 147 of baffle 150 to rotor 120 where flow-inducing energy is imparted to it by discs 132. The liquid is also gasified (e.g., with air) by gas bubbles emerging from the porous disc material. The close proximity of baffles 150 and 152 to the discs 132 prevents liquid 190 from mixing with the liquid flowing on the opposite side of baffles 150 and 152. The first side 151 of baffle 152 directs the gasified liquid away from the rotor device 120. The opposite side 153 of baffle 152, directs liquid 192 to rotor 120 where energy is imparted to it and gasification takes places after which it is directed away from rotor 120 by the second side 149 of baffle 150 which, because of its close proximity to rotor device 120, also prevents water stream 192 from impinging on the flow of liquid 190 which flows in the opposite direction on the opposite side of baffle 150.

Pumping Assembly

Figures 8, 9:
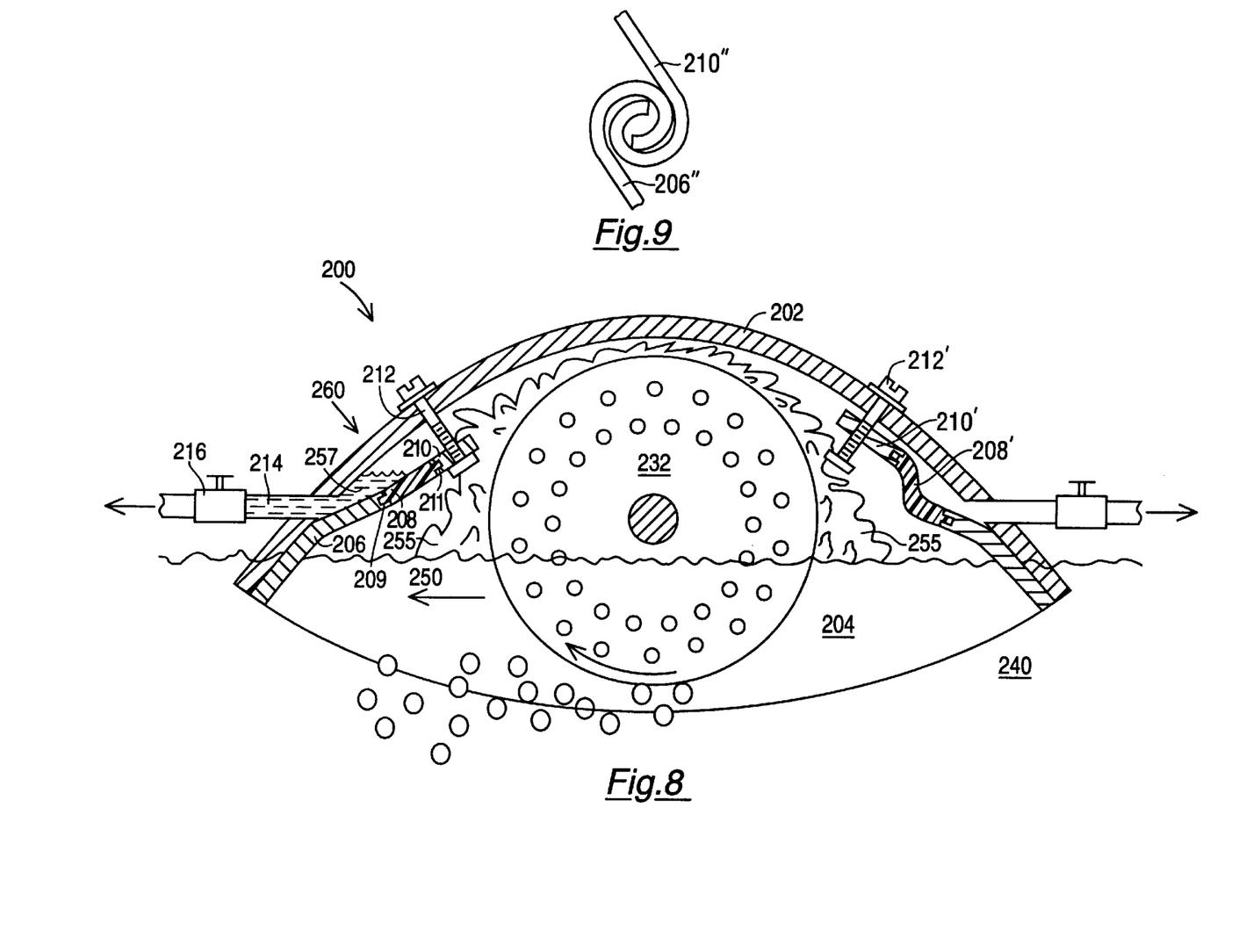
FIG. 8 is a cross-sectional view of another embodiment of the invention illustrating the pumping device, associated container (trough), and opening and closing flap.
FIG. 9 is an end view of a flap and container hinge using overlapping curved ends.

FIG. 8 illustrates a pumping assembly 260 that allows diversion of liquid to above the water surface as a result of disc operation. As the discs 232 rotate they drag a portion 255 of the moved liquid 250 with them which is thrown off the discs in a tangential direction above the surface of the body of water 240. Advantage can be taken of this phenomena by collecting a portion of water 255 in a collection container such as trough positioned in proximity to the rotating discs 232 so as to allow collection of water 257. Water can be diverted in this fashion at up to about 100 gallons per minute per horsepower (0.5 liters per minute per watt) with up to about a three foot head (0.9 m) at no energy cost to the system. The diverted water can be used for irrigation, for diversion to a filtering process or for other uses.

In one of its basic forms, the trough may be formed by attaching a horizontal member 206 lengthwise to the inside of shroud 202 along its side and at opposite ends 204 so as to form a liquid container. Attachment may be made by welding or with suitable adhesives or fasteners such as nuts and bolts or rivets. Alternatively the trough can be made as an integral unit with shroud 202. Although this embodiment is illustrated as being formed as part of shroud 202, it is to be realized that shroud 202 is not an essential feature of the trough and that any receptacle or container capable of holding liquid may be placed near and in a transverse relation with the rotating discs 232 to catch the uplifted water 255. It is also to be realized that the trough may be used with other rotating device components other than discs that move liquid above the liquid surface such as brushes and cages.

As further illustrated in FIG. 8, assembly 260 has a suitable liquid outlet 214 fitted with valve 216 to control the flow of liquid 257 from assembly 260. Optionally, a flap 210 may be attached to horizontal member 206 to open and close the trough and to control the amount of liquid entering into the assembly 260. As illustrated, flap 210 is joined to horizontal member 206 with a resilient material 208. Joining may be accomplished by any suitable means including the use of adhesives, fasteners, or crimping of the resilient material 208 in grooves 209, 211 formed in the edges of horizontal member 206 and flap 210. To open and close the flap 210, an "endless" screw 212 extends through the shroud and is screwed in a threaded hole in flap 210. A flange 218 at the bottom of screw 212 prevents flap 210 from disengaging from screw 212. As screw 212 is rotated, flap 210 is raised or lowered to open and close trough 260. A closed device is illustrated on the left side of FIG. 8, i.e., with flap 210', resilient material 208', and screw 212'. It is to be realized that other components such as hinges or overlapping members with curved ends 206" and 210" (FIG. 9) may be used to provide hinge-type movement to the flap 210". Similarly other equivalent devices for opening and closing the flap such as rods, pull chains, cables, or ropes, and so forth may be substituted for the endless screws 212. Alternatively, the flap 210 and horizontal member 206 can be a rigid single piece without ability to open and close flap 210.

Inlet Restriction Assembly

Figure 10:
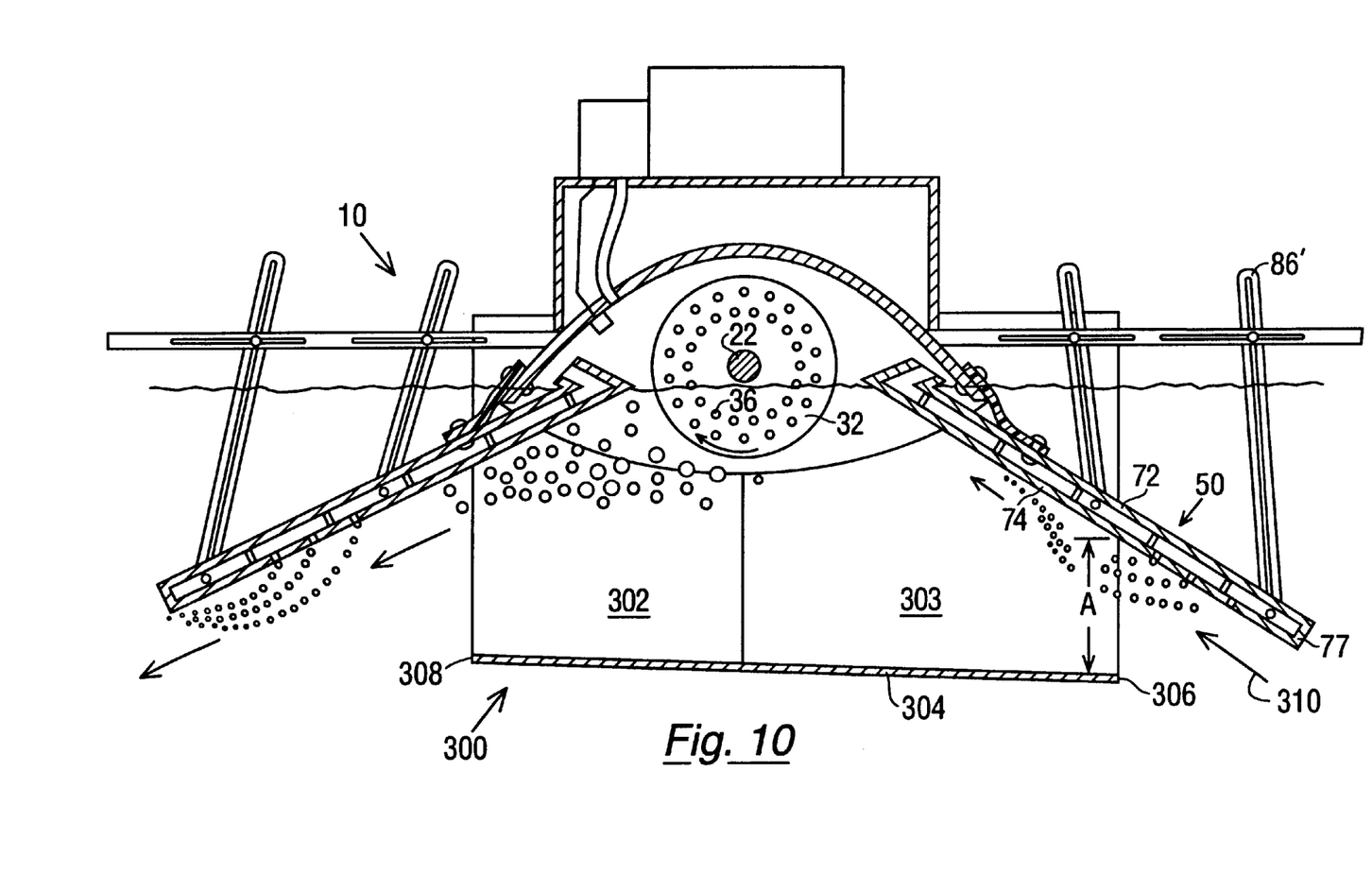
FIG. 10 is a cross-sectional view of another embodiment of the invention illustrating the inlet restriction assembly.
Figure 11:
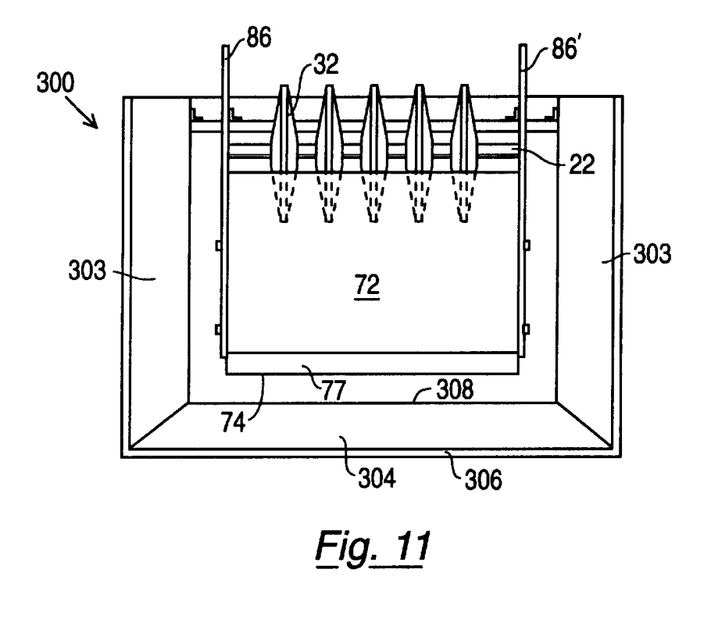
FIG. 11 is an end view of the inlet restriction assembly.
Figure 12:
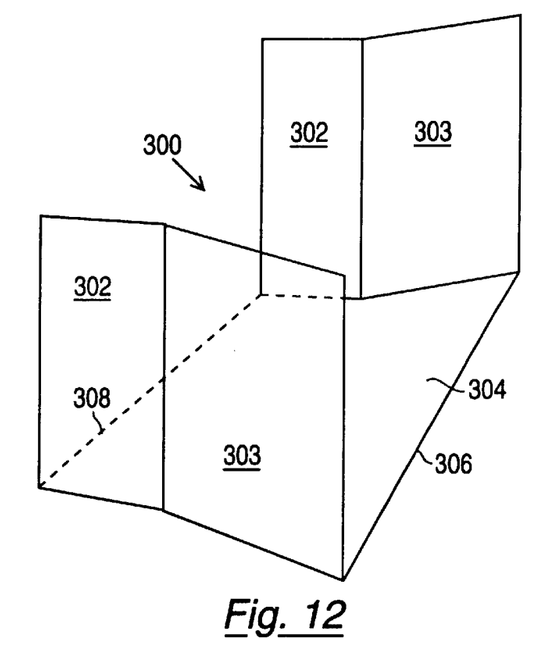
FIG. 12 is a perspective view of an embodiment of the inlet restriction assembly.

As shown in FIGS. 10–12, an inlet restriction assembly 300 may also be used with the liquid management device 10 to restrict water to the upper surface as indicated by arrows 310. Assembly 300 consists of a U-shaped member 300 that consists of sides 302 and bottom 304 and open ends. The device is suitably mounted so that the bottom 304 is below the intake baffle 50 and the rotor discs 32. When restriction assembly 300 is used, intake baffle 50 also serves as a flow restricting device rather than a device only for controlling the direction and treatment of input water. As the intake baffle 50 is lowered, it effectively decreases the area available to incoming water. As a result of the decrease in open area height A, there is an increased flow velocity of the water stream which results in an increased range of output flow. In its simplest form, the inlet restriction assembly has a uniform cross-section throughout, that is, the sides are parallel to each other and the bottom is parallel to the surface of the body of water. To further restrict the incoming flow, bottom 304 slants upward from leading edge 306 to the back edge 308. Additionally, the sides are formed in two portions, the first portions 302 are essentially parallel to each other while the second side portions 303 angle outward from the plane of portions 303. It is to be realized that the inlet restriction assembly can be used without intake baffle 50 or with a variety of aeration devices such as those previously described.

It is possible that changes in configurations to other than those shown could be used but that which is shown is preferred and typical. Without departing from the spirit of this invention, various means of fastening the components together may be used.

It is therefore understood that although the present invention has been specifically disclosed with the preferred embodiment and examples, modifications to the design concerning sizing and shape will be apparent to those skilled in the art and such modifications and variations are considered to be equivalent to and within the scope of the disclosed invention and the appended claims.

I claim:

1. A liquid management unit comprising:
   a) a substantially horizontal rotor device mounted so that at least a portion of a rotating component of said rotor device moves a liquid above a liquid surface of a body of water;
   b) a container for collecting a portion of said liquid moved above said liquid surface; and
   c) a flap that is opened and closed to control the amount of said liquid entering into said container.

2. The liquid management unit according to claim 1 with said flap having a control member for opening and closing said flap.

3. The liquid management unit according to claim 1 wherein said container is formed as part of a shroud covering a portion of said rotor device.

4. The liquid management unit according to claim 1 with said container having a liquid outlet.

5. A liquid management unit comprising:
   a) a rotor device for introducing flow-inducing energy into a liquid; and
   b) an inlet restriction assembly comprising a bottom member with two attached opposite sides with a first, open inlet end and a second opposite open outlet end for directing said liquid from said first open inlet end to said second opposite open outlet end and said rotor device with said first, open inlet end having a larger cross-sectional area than a cross-sectional area of said second, open outlet end.

6. A liquid management unit according to claim 5 wherein at least one of said sides is angled outward toward said open inlet end.

7. A liquid management unit according to claim 5 wherein said bottom slants upward from said first open inlet end to said second opposite open outlet end.

8. A liquid management unit comprising:
   a) a rotor device for introducing flow-inducing energy into a liquid; and
   b) an inlet restriction assembly comprising a bottom member with two attached opposite sides with first and second opposite open ends for directing said liquid to said rotor device; and
   c) a baffle for receiving liquid from a body of liquid and directing said liquid to said rotor device and a baffle securing member for securing said baffle in proximity to said rotor with said baffle contained at least partially within said inlet restriction assembly.

9. A liquid management unit according to claim 8 wherein said baffle is an articulated baffle that on lowering within said inlet restriction assembly decreases the cross-sectional area available to said incoming water.

10. A liquid treatment method comprising the steps of:
    1) partially submerging a substantially horizontal rotating device in a body of liquid;
    2) rotating said substantially horizontal rotor device partially submerged in said body of liquid;
    3) moving a liquid above the surface of said body of water with said substantially horizontal rotor device; and
    4) collecting a portion of said liquid in a container; and
    5) filtering said liquid collected in said container.

11. A liquid treatment method comprising the steps of:
    1) partially submerging a substantially horizontal rotating device in a body of liquid;
    2) rotating said substantially horizontal rotor device partially submerged in said body of liquid to induce a flowing liquid in said body of liquid;
    3) increasing a flow rate of said flowing liquid by passing said flowing liquid from an inlet to an outlet with said inlet having a larger cross-sectional area than a cross-sectional area of said outlet.

* * * * *